United States Patent
Koshijima et al.

(10) Patent No.: US 8,326,356 B2
(45) Date of Patent: *Dec. 4, 2012

(54) IMAGE TRANSMISSION APPARATUS, IMAGE TRANSMISSION METHOD AND IMAGE TRANSMISSION PROGRAM PRODUCT

(75) Inventors: Miwa Koshijima, Osaka (JP); Michiaki Koizumi, Daito (JP); Fumiaki Matsumoto, Higashi-Osaka (JP)

(73) Assignee: Kyocera Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,188

(22) Filed: Sep. 23, 2011

(65) Prior Publication Data

US 2012/0015692 A1   Jan. 19, 2012

Related U.S. Application Data

(63) Continuation of application No. 12/059,254, filed on Mar. 31, 2008, now Pat. No. 8,050,710.

(30) Foreign Application Priority Data

Mar. 29, 2007 (JP) ................................. 2007-086711

(51) Int. Cl.
*H04M 1/00* (2006.01)
(52) U.S. Cl. .................. 455/556.1; 455/552.1; 455/566; 455/67.7
(58) Field of Classification Search ............. 455/556.1, 455/552.1, 566, 67.11, 556.2, 557, 550.1, 455/90.1, 90.2, 414.1, 67.7; 345/620, 690
See application file for complete search history.

(56) References Cited

U.S. PATENT DOCUMENTS

| 2003/0058262 A1* | 3/2003 | Sato et al. ...................... 345/690 |
| 2004/0239686 A1* | 12/2004 | Koyama et al. ............... 345/620 |
| 2006/0140508 A1 | 6/2006 | Ohgishi et al. |
| 2007/0076095 A1* | 4/2007 | Tomaszewski ............... 348/155 |

FOREIGN PATENT DOCUMENTS

| JP | 2006-013856 | 1/2006 |
| JP | 2006270380 | 10/2006 |
| JP | 2007-018386 | 1/2007 |
| WO | WO-2004/039068 | 5/2004 |

OTHER PUBLICATIONS

Notice of Ground of Rejection (translation) for JP 086711/2007, mailed Feb. 7, 2012, 6 pages.
Notice of Ground of Rejection for Japanese Patent Application No. 086711/2007, mailed May 15, 2012, 7 pages. (including English translation).
JP 2007-086711 JP Decision of Rejection and Decision to Decline Amendment mailed Sep. 4, 2012.

* cited by examiner

*Primary Examiner* — John J Lee
(74) *Attorney, Agent, or Firm* — Duane Morris LLP; Richard C. Kim

(57) ABSTRACT

A cellular phone includes, for the sake of privacy protection, a camera for outputting a pick up image in which an operator is photographed, a touch panel to accept designation of at least a partial region of the pick up image, and a control portion to determine a masked region to mask at least a part of the pick up image based on the accepted region, generate a composite image in which the masked region of the pick up image is converted to another image, and transmit the composite image.

12 Claims, 11 Drawing Sheets

IMAGE TRANSMISSION APPARATUS, IMAGE TRANSMISSION METHOD AND IMAGE TRANSMISSION PROGRAM PRODUCT

This application is a continuation of U.S. application Ser. No. 12/059,254 filed on Mar. 31, 2008 currently allowed. This application claims priority to Japanese Patent Application No. 2007-086711 filed with Japan Patent Office on Mar. 29, 2007, the entire content of which is hereby incorporated by reference.

BACKGROUND OF THE INVENTION

1. Field of the Invention

The present invention relates to an image transmission apparatus, an image transmission method, and an image transmission program product, and particularly relates to a portable image transmission apparatus, a pick up image transmission method executed by the image transmission apparatus, and a pick up image transmission program product executed by the image transmission apparatus.

2. Description of the Related Art

In recent years, cellular phones capable of communication by picture phone have been becoming widely available. With picture phone, an image of a speaker is transmitted simultaneously with speech, and therefore, it is possible to shorten psychological distance between speakers. In addition, portability of cellular phones eliminates restriction on place of calling. Therefore, background images behind speakers photographed by a camera are different in each case depending on time and place of calling. For example, when a picture phone receives a calling while one is walking on a road, faces of others may be included in the background, and thus, in some cases transmission of images including such a background to a person on the other end is not desirable. In this case, one should either give up using the picture phone or move to some other place where the background is fair if photographed, and then resume calling on picture phone. This results in such problems that one is unable to respond to requests of a person on the other end or it takes much time before answering an incoming call.

Conventionally, such a picture phone apparatus is known that recognizes the boundary between the person and background of a dynamic image photographed by the camera to extract the background region, replaces the background image portion of the dynamic image photographed by the camera by a background image stored in advance, and then transmits the dynamic image data.

However, this requires the sophisticated image processing of extracting the background region by recognizing the boundary between the person and background of a dynamic image photographed by the camera, and thus causes problems including failure of processing if the boundary between the person and background is recognized incorrectly. This also requires a substantial amount of time for the extraction processing of the background region, resulting in problems including elongated time required before transmission of the dynamic image.

SUMMARY OF THE INVENTION

The present invention is made to solve above-mentioned problems, and one of the objects of the present invention is to present an image transmission apparatus capable of privacy protection.

Another object of the present invention is to present an image transmission method and an image transmission program product that are capable of privacy protection.

In order to achieve the aforementioned objects, according to an aspect of the present invention, an image transmission apparatus includes: an imaging portion to output a pick up image of a shooting object; a region designation portion to accept designation of at least a partial region of the pick up image; a masked region determining portion to determine a masked region for masking at least a part of the pick up image based on the accepted region; a composite image generation portion to generate a composite image in which the masked region of the pick up image is converted to another image; and a transmission portion to transmit the composite image.

According to another aspect of the present invention, an image transmission method includes the steps of: acquiring a pick up image of a shooting object; accepting designation of at least a partial region of the pick up image; determining a masked region for masking at least a part of the pick up image based on the accepted region; generating the composite image in which the masked region of the pick up image is converted to another image; and transmitting the composite image.

According to further another aspect of the present invention, the image transmission program product causes a computer to execute the steps of acquiring a pick up image of a shooting object; accepting designation of at least a partial region of the pick up image; determining a masked region for masking at least a part of the pick up image based on the accepted region; generating a composite image in which the masked region of the pick up image is converted to another image; and transmitting the composite image.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
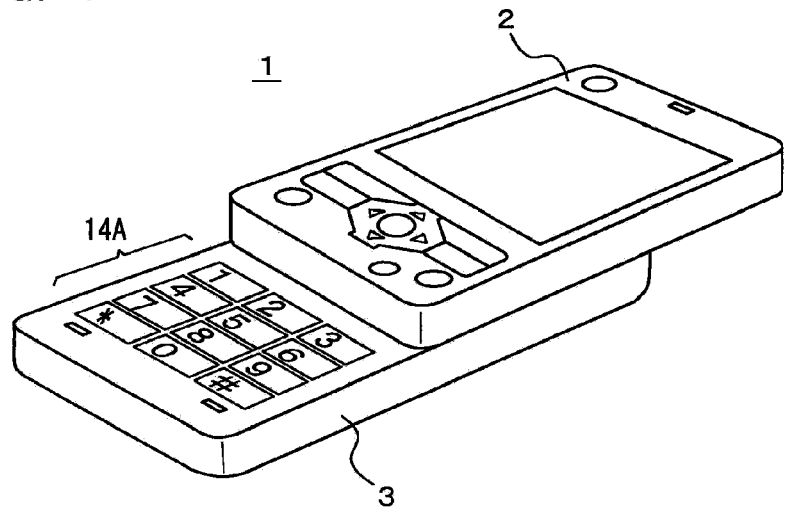
FIG. 1 is a perspective view showing external appearance of a cellular phone in one embodiment of the present invention.

Embodiments of the present invention will now be described with reference to the drawings. In the following description, like reference characters denote like parts, which have like names and functions, and therefore, detailed description thereof will not be repeated.

The following description explains a cellular phone 1 as one example of a picture phone as the image transmission apparatus. FIG. 1 is a perspective view showing external appearance of a cellular phone in one embodiment of the present invention. Referring to FIG. 1, cellular phone 1 includes a display side portion 2 and an operation side portion 3. The rear surface of display side portion 2 faces the surface of operation side portion 3 so that display side portion 2 is slidable in the longitudinal direction. FIG. 1 shows a state where display side portion 2 is slid with regard to operation side portion 3 to open cellular phone 1. When cellular phone 1 is closed, the rear surface of display side portion 2 and the surface of operation side portion 3 are overlapped.

Figure 2:
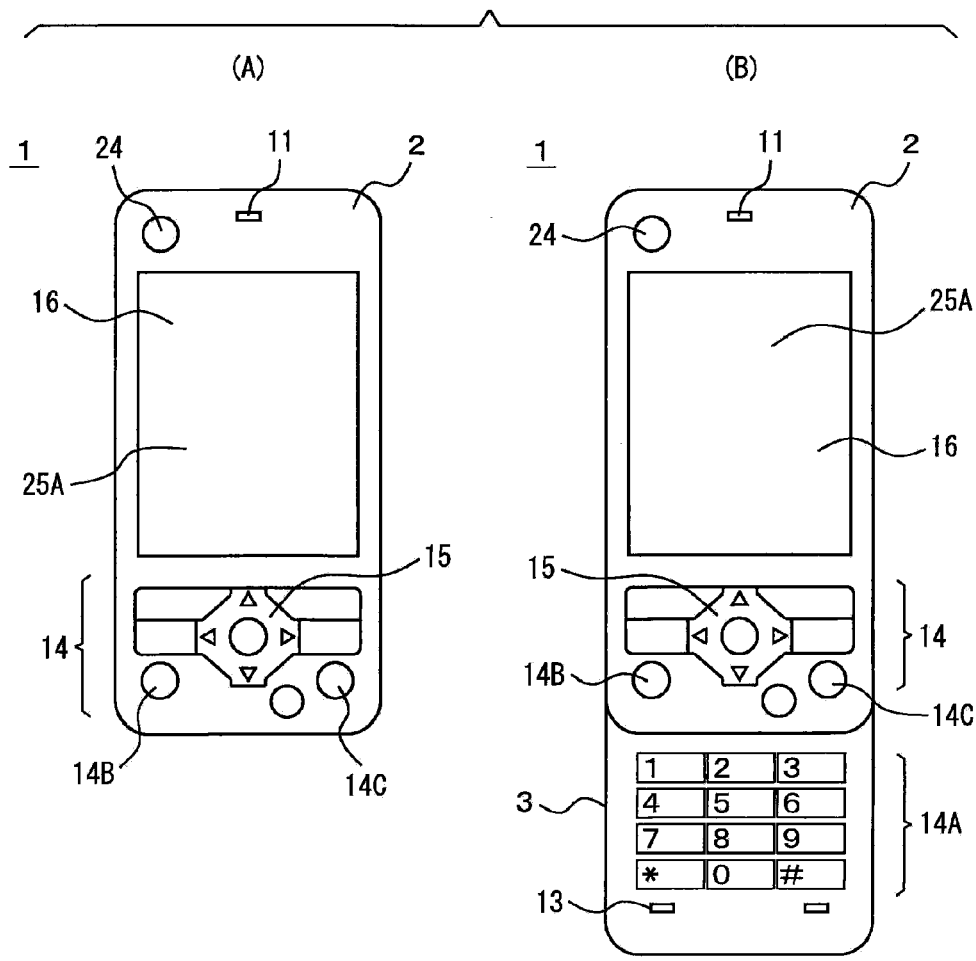
FIGS. 2A and 2B are plan views of the cellular phone.

FIG. 2A is a plain view of cellular phone 1 in closed state. FIG. 2B is a plain view of cellular phone 1 in open state. Referring to FIG. 2A and FIG. 2B, on the surface of display side portion 2, there are arranged a camera 24, a liquid crystal display device (LCD) 16, a touch panel 25A, an operation key 14 including a talk key 14B, an indication key 15, and a talk end key 14C, and a speaker 11. Touch panel 25A is made of a transparent material and is provided onto the entire display surface of LCD 16. An example where cellular phone 1 includes LCD 16 is shown here, an organic electro luminescence display or the like may be used instead of LCD 16.

When cellular phone 1 is open, a part of the surface of operation side portion 3 is exposed. On the exposed surface of operation side portion 3, there are arranged a numerical keypad 14A comprising a part of operation key 14 and a microphone 13. Further, a second speaker 12 (see FIG. 4) is arranged to the side face of operation side portion 3.

Figure 3:
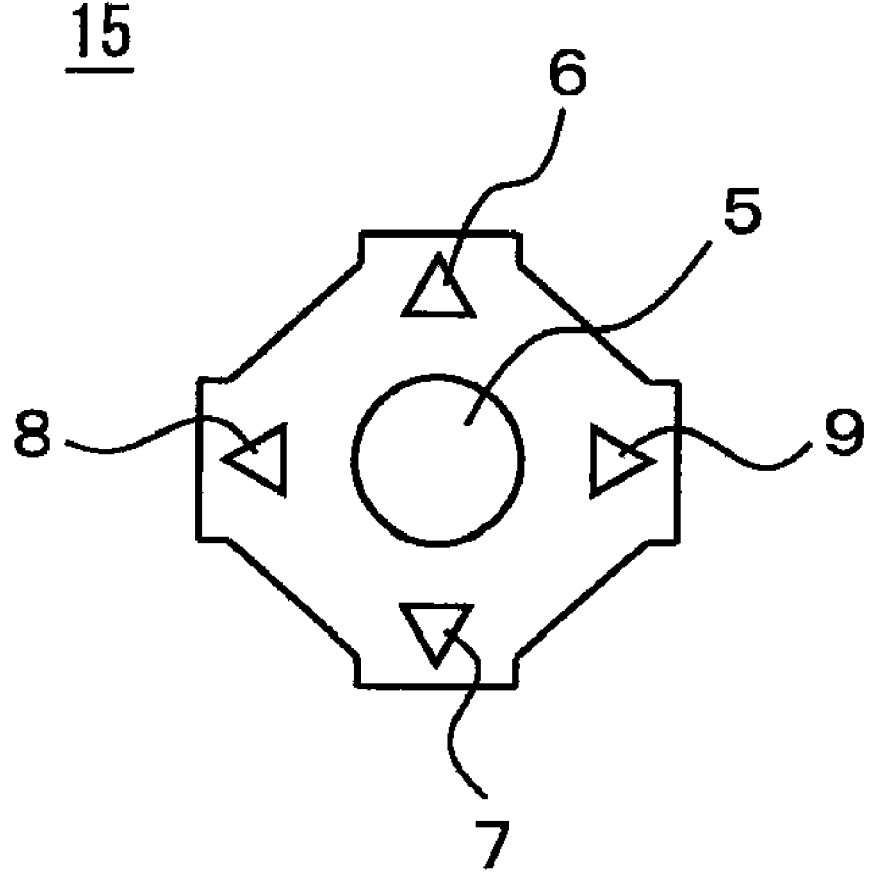
FIG. 3 is a diagram showing arrangement of indication keys.

FIG. 3 is a diagram showing arrangement of the indication keys. Referring to FIG. 3, indication key 15 includes a determining key 5, an upward arrow key 6, a downward arrow key 7, a left arrow key 8, and a right arrow key 9. Determining key 5, upward arrow key 6, downward arrow key 7, left arrow key 8, and right arrow key 9 are button switches which are turned ON when pressed. Cellular phone 1 is able to display a pointer on LCD 16, and when operation of indication key 15 by a user is accepted, cellular phone 1 moves the pointer up, down, right, or left depending on which of upward arrow key 6, downward arrow key 7, left arrow key 8, and right arrow key 9 is pressed. This enables it to designate any position of the display surface of LCD 16.

Figure 4:
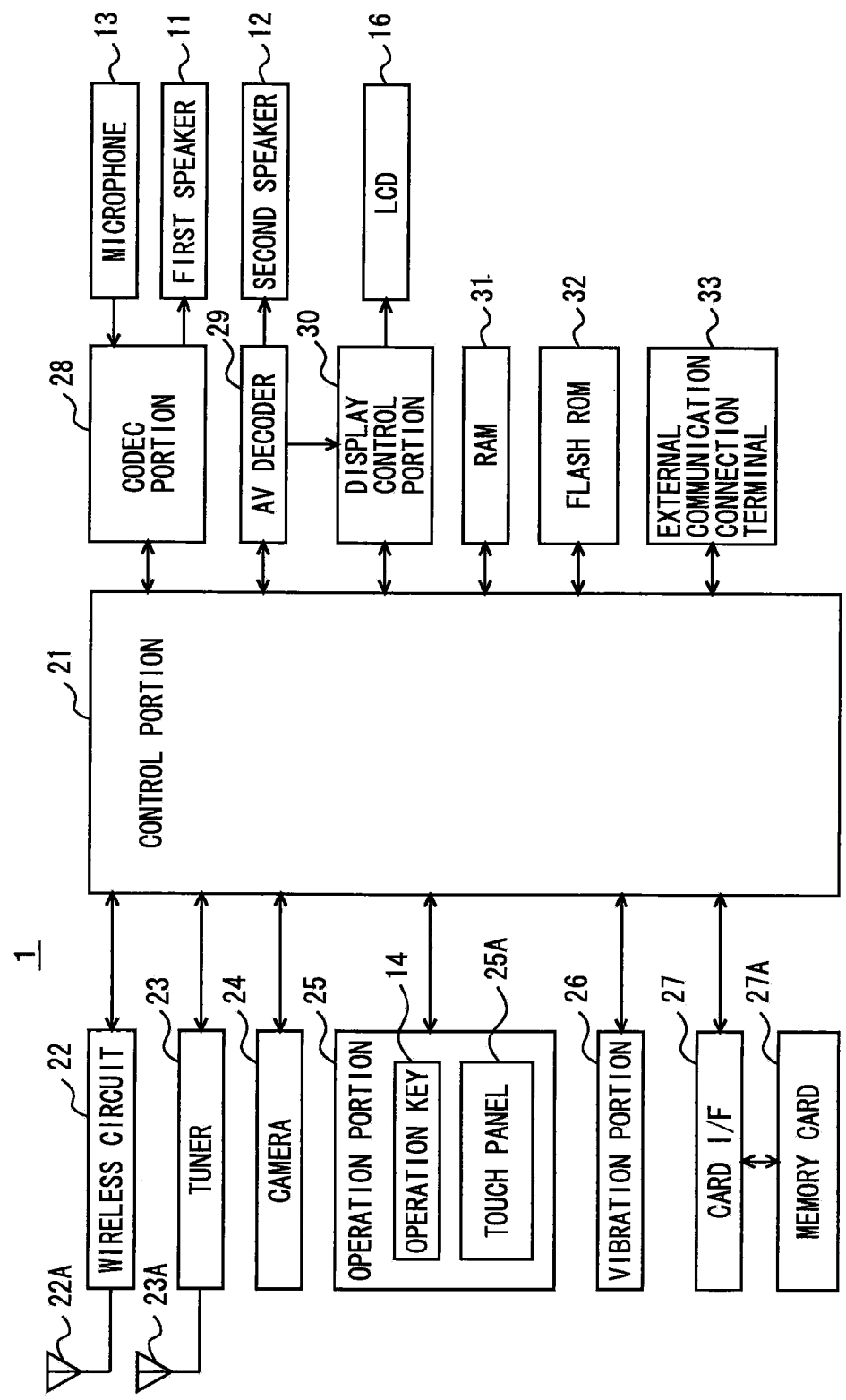
FIG. 4 is a functional block diagram showing an example of an outline of functions of the cellular phone.

FIG. 4 is a functional block diagram showing an example of an outline of functions of cellular phone 1. Referring to FIG. 4, cellular phone 1 includes a control portion 21 to control the entirety of cellular phone 1, a wireless circuit 22 connected to an antenna 22A, a codec portion 28 to process audio data, a microphone 13 and a first speaker 11 each connected to codec portion 28, a tuner 23 connected to an antenna 23A, an AV decoder 29, camera 24, an operation portion 25 to accept input of user operation, a display control portion 30 to control display of LCD 16, a RAM (Random Access Memory) 31 used as a working area of control portion 21, a flash ROM (Flash Read Only Memory) 32 to store programs to be executed by control portion 21, a vibration portion 26, a card interface (I/F) 27, and an external communication connection terminal 33 which serves as a serial interface.

Wireless circuit 22 accepts input of a wireless signal received by antenna 22A and outputs to codec portion 28 an audio signal resulting from demodulation of the wireless signal. Further, wireless circuit 22 accepts an audio signal input from codec portion 28 and outputs to antenna 22A a wireless signal resulting from modulation of the audio signal. Codec portion 28 demodulates the audio signal input from wireless circuit 22, converts digital decoded audio signal to an analog audio signal, amplifies it, and outputs it to first speaker 11. Further, codec portion 28 accepts an analog audio signal input from microphone 13, converts the audio signal to a digital signal, encodes it, and outputs the encoded audio signal to wireless circuit 22.

Tuner 23 is connected to antenna 23A and accepts input of a broadcast signal received by antenna 23A. The broadcast signal is a high-frequency digital modulation signal including image data and audio data. Tuner 23 takes out a specific frequency signal from a high-frequency digital modulation signal input from antenna 23A. Further, tuner 23 is provided with an reverse interleaved circuit and an error correction circuit, and demodulates obtained high-frequency digital modulation signal of the specific frequency and outputs coded data to AV decoder 29. AV decoder 29 is provided with a video decoder and an audio decoder, and decodes the coded data input from tuner 23 to generate an image signal and an audio signal, outputs the image signal to display control portion 30, executes D/A (digital/analog) conversion of the audio signal, and feeds it to second speaker 12. While an example where a broadcast wave of digital television broadcast is received and reproduced is shown here, a broadcast wave of analog television broadcast may be received and reproduced. Further, instead of television broadcast or in addition to television broadcast, a broadcast of radio broadcast may be received and reproduced.

Display control portion 30 is controlled by control portion 21 and causes LCD 16 to display an image by controlling LCD 16 according to an instruction input from control portion 21. The image to be displayed on LCD 16 includes dynamic images and still images.

Camera 24 includes a lens and a photoelectric conversion element such as a CMOS (Complementary Metal Oxide Semiconductor) sensor or the like, forms an image of light condensed by the lens to the CMOS sensor, while the CMOS sensor photoelectrically converts the received light and outputs image data to control portion 21. Camera 24 is controlled by control portion 21, starts picking up an image according to an instruction from control portion 21, and outputs obtained still image data or dynamic image data to control portion 21. Camera 24 includes an image processing circuit to execute image processing to improve the image quality of photoelectrically converted image data, and an A/D conversion circuit to convert image data from analog data to digital data. Control portion 21 outputs still image data or dynamic image data output by camera 24 to display control portion 30 and causes LCD 16 to display the data. Further, it is possible for control portion 21 to encode still image data or dynamic image data and to store the data in flash ROM 32 or a memory card 27A mounted to a card I/F 27. Further, when cellular phone 1 functions as the picture phone, camera 24 encodes dynamic image data by a predetermined compression coding system and outputs it to control portion 21.

Operation portion 25 includes operation key 14 and touch panel 25A. Operation key 14 and touch panel 25A accept input of an operation by the user and outputs the accepted operation to control portion 21.

Removable memory card 27A is mounted to card I/F 27. Examples of memory card 27A includes CompactFlash, SmartMedia (registered trademark), SD (Secure Digital)/MiniSD/MicroSD memory card, memory stick, MMC (Multimedia Card), and xD picture card.

Control portion 21 can access memory card 27A via card I/F 27. While a program to be executed by control portion 21 is stored in flash ROM 32 in advance in this example, the program may be stored in memory card 27A and then read from memory card 27A to be executed by control portion 21. Recording medium for storing the program is not limited to memory card 27A; other examples include flexible disk, cassette tape, optical disk (CD-ROM (Compact Disc-ROM)/MO (Magnetic Optical Disc)/MD (Mini Disc)/DVD (Digital Versatile Disc)), optical card, mask ROM, and semiconductor memory such as EPROM. Further, cellular phone 1 may be connected to the Internet via wireless circuit 22, and download the program from a computer connected to the Internet to be executed by control portion 21. The program as used herein includes, in addition to programs executable directly by control portion 21, a source program, a compressed program, and an encrypted program.

Figure 5:
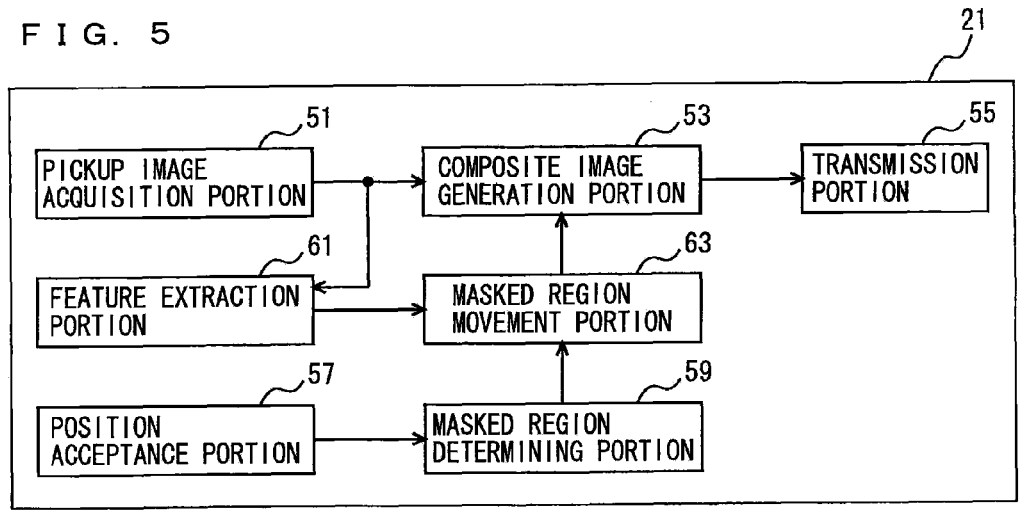
FIG. 5 is a functional block diagram showing an example of an outline of functions of a control portion.

FIG. 5 is a functional block diagram showing an example of an outline of functions of control portion 21. Referring to FIG. 5, control portion 21 includes a pick up image acquisition portion 51 to acquire a pick up image, a position acceptance portion 57 to accept designation of any position in the pick up image, a masked region determining portion 59 to determine a masked region, a composite image generation portion 53 to generate a composite image in which the masked region of the pick up image is replaced by another image, a transmission portion 55 to transmit the composite image, a feature extraction portion 61 to extract from the pick up image a feature included therein, and a masked region movement portion 63 to move the masked region with regard to the pick up image according to movement of the feature in the pick up image.

Pick up image acquisition portion 51 accepts input of a pick up image of a shooting object that is picked up and output by camera 24. Pick up image acquisition portion 51 acquires the input pick up image. Pick up image acquisition portion 51 outputs the acquired pick up image to composite image generation portion 53 and feature extraction portion 61. The pick up image being input from camera 24 includes still images and dynamic images. An example where a dynamic image is input as the pick up image will be explained here. When the pick up image is input from pick up image acquisition portion 51, composite image generation portion 53 outputs the pick up image to display control portion 30 and causes LCD 16 to display it.

Position acceptance portion 57 accepts designation of any position in the pick up image. Position acceptance portion 57 accepts a position in the pick up image designated by the user on touch panel 25A. Position acceptance portion 57 identifies a position in the pick up image displayed on LCD 16 from the position detected by touch panel 25A. Further, position acceptance portion 57 accepts a position of a pointer at the time when the user press determining key 5 after moving the pointer displayed on LCD 16 by manipulating indication key 15. Position acceptance portion 57 accepts the position in the pick up image displayed on LCD 16 from the position of the pointer displayed on LCD 16. Position acceptance portion 57 outputs the accepted position in the pick up image to masked region determining portion 59.

Masked region determining portion 59 determines a masked region in the pick up image based on the position in the pick up image input from position acceptance portion 57 and outputs the determined masked region to masked region movement portion 63. Masked region determining portion 59 shifts the mode to either masked region designation mode or non-masked region designation mode. In the masked region designation mode, masked region determining portion 59 determines, as the masked region, the point in the pick up image input from position acceptance portion 57 or a predetermined range around the position. When the user traces the touch panel by his/her fingers, or describes a tip by indication key 15, a plurality of neighboring positions are input continuously from position acceptance portion 57. Masked region determining portion 59 determines, as the masked region, a predetermined region from the plurality of positions input continuously. Alternatively, a region delimited by the plurality of positions input continuously may be determined as the masked region.

In the non-masked region designation mode, masked region determining portion 59 determines, as the non-masked region, a predetermined range from the position in the pick up image input from position acceptance portion 57. Masked region determining portion 59 determines, as the non-masked region, a region of a predetermined range from a plurality of positions input continuously from position acceptance portion 57. Alternatively, a region delimited by the plurality of positions input continuously may be considered as the non-masked region. Masked region determining portion 59 determines, as the masked region, the region other than the non-masked region in the pick up image.

Figure 6:
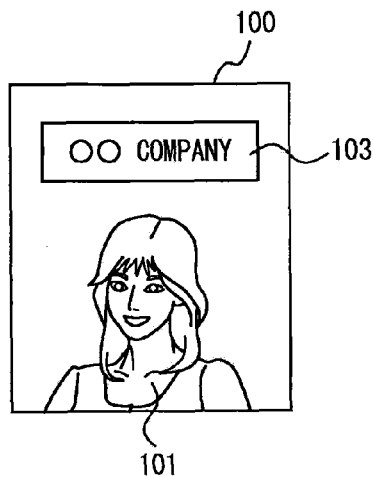
FIG. 6 is a diagram showing an example of a pick up image.
Figure 7:
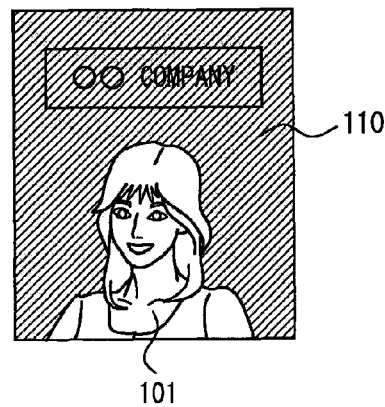
FIG. 7 is a first diagram showing an example of a masked region.
Figure 8:
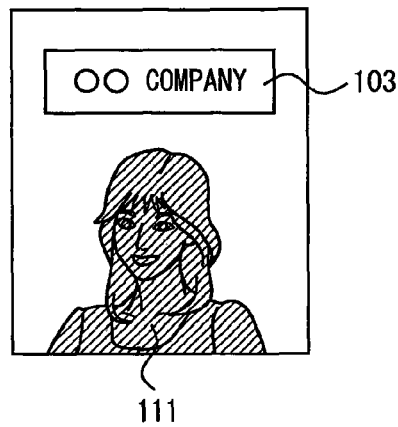
FIG. 8 is a diagram showing an example of a non-masked region.
Figure 9:
FIG. 9 is a second diagram showing an example of a masked region.

Now, designation of a masked region will be specifically explained. FIG. 6 is a diagram showing an example of a pick up image. Referring to FIG. 6, a pick up image 100 includes an image 101 of an operator of cellular phone 1 as the shooting object, and an image 103 of an advertising display on which characters of "Company" are represented. FIG. 7 is a first diagram showing an example of the masked region. When, while pick up image 100 shown in FIG. 6 is displayed on LCD 16, the operator gives an instruction to paint out all regions other than own image 101 on touch panel 25A, masked region 110 shown by hatching in FIG. 7 is identified. FIG. 8 is a diagram showing an example of the non-masked region. When, while pick up image 100 shown in FIG. 6 is displayed on LCD 16, the operator gives an instruction to paint out own image 101 on touch panel 25A, non-masked region 111 shown by hatching in FIG. 7 is identified. FIG. 9 is a second diagram showing an example of the masked region. When, while pick up image 100 shown in FIG. 6 is displayed on LCD 16, the operator gives an instruction to paint out the region of image 103 of the advertising display on which characters of "Company" are represented on touch panel 25A, masked region 113 shown by hatching in FIG. 9 is identified.

Figure 10:
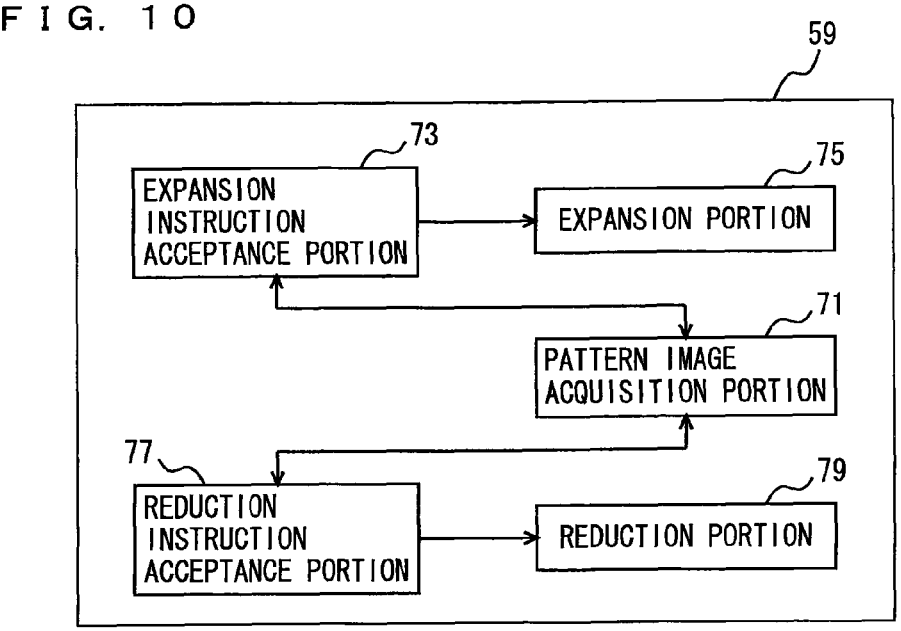
FIG. 10 is a functional block diagram showing a function of determining a masked region using a pattern image of a masked region determining portion.

Referring back to FIG. 5, masked region determining portion 59 can determine a masked region based on a pattern image stored in advance in flash ROM 32. FIG. 10 is a functional block diagram showing the function of masked region determining portion 59 to determine the masked region using a pattern image. Referring to FIG. 10, masked region determining portion 59 includes a pattern image acquisition portion 71 to acquire a pattern image, an expansion instruction acceptance portion 73 to accept an expansion instruction, an expansion portion 75 for expand the masked region based on the expansion instruction, a reduction instruction acceptance portion 77 to accept a reduction instruction, and a reduction portion 79 to reduce the masked region based on reduction instruction.

Pattern image acquisition portion 71 reads the pattern image stored in advance in flash ROM 32. A plurality of pattern images may be stored in advance in flash ROM 32 so that any one of the pattern images is selected based on a feature of the image included in the pick up image, or the operator may select one of the images. Pattern image acquisition portion 71 outputs the read pattern image to display control portion 30, causes LCD 16 to display an image in which a pattern image is superimposed onto the displayed pick up image, and outputs the image to expansion instruction acceptance portion 73 and reduction instruction acceptance portion 77.

When a pattern image is input from pattern image acquisition portion 71, expansion instruction acceptance portion 73 sets the pattern image as the masked region. Expansion instruction acceptance portion 73 accepts input of the masked region from expansion portion 75 or reduction portion 79. Further, expansion instruction acceptance portion 73 accepts an expansion instruction from touch panel 25A or indication key 15. Expansion instruction acceptance portion 73 accepts the expansion instruction when the user, after having indicated the position of the masked region on touch panel 25A, continuously indicates a position other than the masked region. The expansion instruction includes the position other than the masked region. Upon acceptance of the expansion instruction, expansion instruction acceptance portion 73 outputs the position other than the masked region included in the accepted expansion instruction and the masked region at this time to expansion portion 75.

Expansion portion 75 expands the masked region accepted from expansion instruction acceptance portion 73 to the position other than the masked region. Expansion portion 75 outputs the expanded masked region to expansion instruction acceptance portion 73 and reduction instruction acceptance portion 77.

When a pattern image is input from pattern image acquisition portion 71, reduction instruction acceptance portion 77 sets the pattern image as the masked region. Further, reduction instruction acceptance portion 77 accepts input of the masked region from expansion portion 75 or reduction portion 79. Furthermore, reduction instruction acceptance portion 77 accepts a reduction instruction from touch panel 25A or indication key 15. Reduction instruction acceptance portion 77 accepts the reduction instruction when the user, after having indicated the position other than the masked region on touch panel 25A, continuously indicates the position of the masked region. The reduction instruction includes the position of the masked region. Upon acceptance of the reduction instruction, reduction instruction acceptance portion 77 outputs the position of the masked region included in the accepted reduction instruction and the masked region at this time to reduction portion 79.

Reduction portion 79 reduces the masked region accepted from reduction instruction acceptance portion 77 to the position of the masked region. Reduction portion 79 outputs the reduced masked region to expansion instruction acceptance portion 73 and reduction instruction acceptance portion 77.

Figure 11:
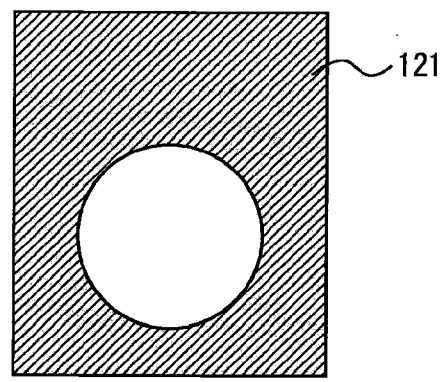
FIG. 11 is a diagram showing an example of the pattern image.
Figure 12:
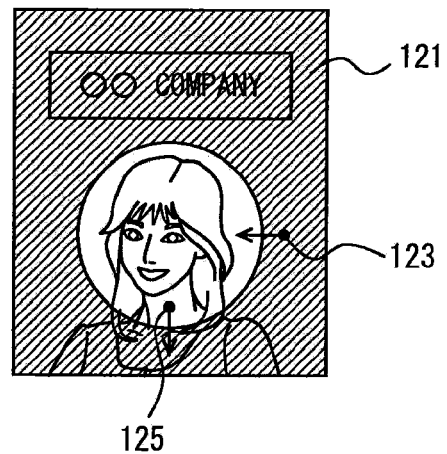
FIG. 12 is a diagram showing an image in which a masked region of the pattern image is superimposed onto a pick up image.
Figure 13:
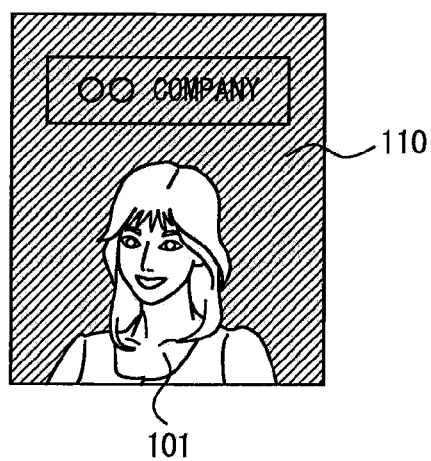
FIG. 13 is a diagram showing a masked region after expansion or reduction of the pattern image.

A specific example of the case where a masked region is determined using a pattern image will be explained. FIG. 11 is a diagram showing an example of the pattern image. Referring to FIG. 11, the pattern image includes a pattern 121 that is intended to be a masked region. In the figure, pattern 121 is shown by hatching. The pattern image includes a region other than a circular masked region positioned roughly in the center of the diagram. FIG. 12 is a diagram showing an image where the masked region of the pattern image is superimposed onto a pick up image. Referring to FIG. 12, when the user indicates on touch panel 25A a position shown by point 123 and moves the user's finger in the direction of an arrow extending from point 123, then the reduction instruction is accepted. When, while the pattern image provided onto the pick up image is displayed on LCD 16, the user indicates a position shown by point 125 on touch panel 25A and moves the user's finger in the direction of an arrow extending from point 125, then the expansion instruction is accepted. FIG. 13 is a diagram showing the masked region after expansion or reduction of the pattern image.

In this way, since the masked region can be changed by expanding or reducing the masked region included in the pattern image on touch panel 25A, a masked region adjusted to a pick up image can be determined with ease.

Returning to FIG. 5, feature extraction portion 61 extracts a feature from the pick up image input from pick up image acquisition portion 51. The feature is included in a characteristic shape, color, or pattern, such as human eye and characters, included in the pick up image. The feature can be determined by binarizing the pick up image and extracting a predetermined shape or by extracting a predetermined color portion from the pick up image.

Feature extraction portion 61 outputs the extracted feature to masked region movement portion 63. When the positions of the identical feature extracted from two pick up images input from pick up image acquisition portion 51 at different times are different, feature extraction portion 61 calculates a movement vector and outputs it to masked region movement portion 63.

Masked region movement portion 63 outputs the masked region input from masked region determining portion 59 to composite image generation portion 53. Further, when a movement vector is input from feature extraction portion 61, masked region movement portion 63 moves the masked region in the pick up image in the direction and the distance identified by the movement vector, and outputs the moved masked region to composite image generation portion 53.

Composite image generation portion 53 generates a composite image in which, of the pick up image input from pick up image acquisition portion 51, a masked region input from masked region movement portion 63 is replaced by a preset image. The preset image is stored in advance in flash ROM 32 and determined when the user selects one or more than one from a plurality of preset images. Composite image generation portion 53 outputs the composite image to transmission portion 55.

Transmission portion 55 transmits the composite image input from composite image generation portion 53 to the picture phone of the person on the other end via wireless circuit 22.

Figure 14:
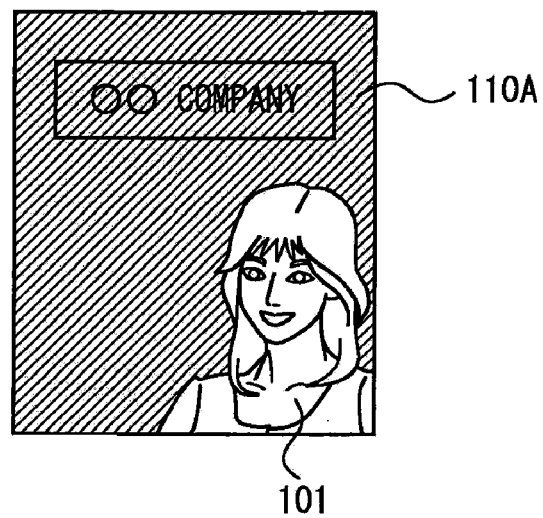
FIG. 14 is a first diagram showing an example of a masked region after movement.

Here, movement of the masked region will be described. FIG. 14 is a first diagram showing one example of the masked region after movement. In this example, a case where the operator moves in the pick up image is shown while human eye is used as the feature. Masked region 110 shown in FIG. 7 moves as image 101 of the operator moves. In FIG. 14, region 110A shown by hatching is the moved masked region. A region outside the masked region is newly set as a masked region.

Figure 15:
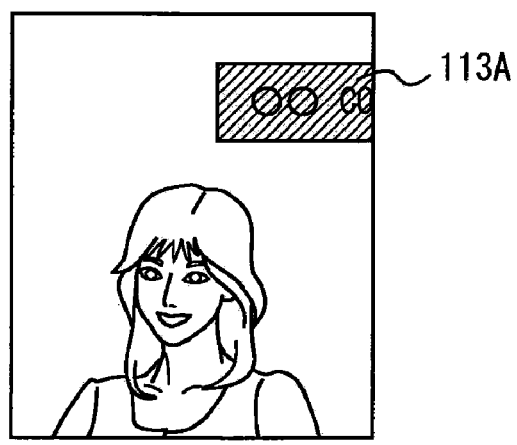
FIG. 15 is a second diagram showing an example of a masked region after movement.

FIG. 15 is a second diagram showing an example of the masked region after movement. In this example, the case where the pick up range of camera 24 is moved to the left is shown, while characters in the pick up image are used as the feature. With regard to masked region 113 shown in FIG. 9, characters "Company" in the pick up image move as the pick up range of camera 24 changes. Masked region 113 shown in FIG. 9 is moved by as much as the movement of characters "Company" in the pick up image to the position of masked region 113A shown by hatching in FIG. 15.

Figure 16:
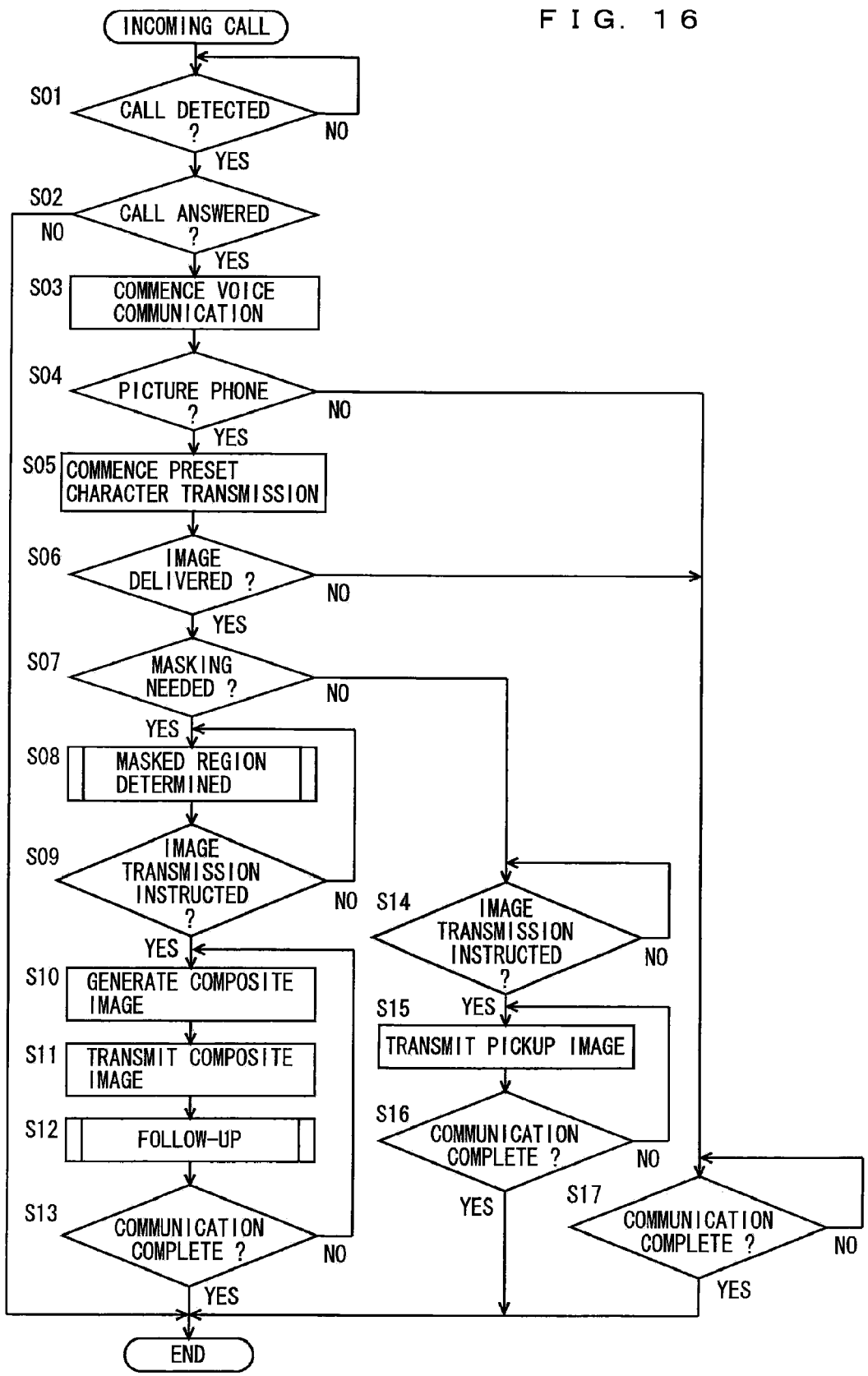
FIG. 16 is a flowchart showing an example of flow of incoming call processing.

FIG. 16 is a flowchart showing an example of a flow of incoming call processing. Incoming call processing is executed by control portion 21 by executing the pick up image transmission program. Referring to FIG. 16, control portion 21 judges whether or not an incoming call is detected (step S01). When wireless circuit 22 receives an incoming call signal, an incoming call is detected. A stand-by state is maintained until an incoming call is detected ("NO" in step S01), and the processing proceeds to step S02 upon detection of an incoming call. That is, the incoming call processing is executed on condition that an incoming call is detected.

In step S02, whether or not a call answering instruction is accepted is judged. Whether or not talk key 14B is pressed is judged. When a call answering instruction is accepted, the processing proceeds to step S03, otherwise the processing is completed. This is because a communication is not established if the operator has no intention to answer the calling.

When the processing proceeds to step S03, a communication is established with regard to the picture phone at the calling party. In step S03, a voice communication is commenced. Voice communication is now made possible at this stage.

In step S04, whether or not the communication is by means of picture phone is judged. If the communication is by means of picture phone, the processing proceeds to step S05, and if not, the processing proceeds to step S17. When the processing proceeds to step S05, and dynamic image data is received from the picture phone at the calling party, the dynamic image data is output to display control portion 30 and LCD 16 is caused to display the dynamic image data. In step S17, whether or not a communication by voice is completed is judged. The processing turns into a stand-by state until communication is completed ("NO" in step S17), and upon completion of the communication, the processing is completed. Completion of the communication is judged by detection of communication disconnection or of pressing of communication completion key 14C.

In step S05, transmission of preset characters is started. Specifically, preset characters stored in advance in flash ROM 32 are read out and transmitted to the picture phone on the other end via wireless circuit 22. With these operations, the preset characters are displayed on the picture phone at the other end. At this stage, an image obtained by picking up by camera 24 is not transmitted to the picture phone at the other end.

In the next step S06, whether or not an image is transmitted is judged. Whether or not an image is transmitted may be set in advance, or may be judged according to an instruction entered by the user through operation key 14. When the image is transmitted, the processing proceeds to step S07, and if not, it proceeds to step S13.

In step S07, whether to mask the image is judged. Whether to mask the image may be judged according to setting that is set in advance, or judged according to an instruction entered by the user. When judgment is made according to an instruction entered by the user, camera 24 picks up an image of the operator and outputs the pick up image which is then displayed on LCD 16, and at the same time, a message asking whether to mask the pick up image is displayed on LCD 16 to prompt the user to enter an instruction. If a key of the operation keys 14 to which indication of masking is assigned is entered by the user, the processing proceeds to step S08, and if not, it proceeds to step S14.

In step S08, masked region determining processing is executed. The masked region determining processing, described later, is processing to determine a masked region in the pick up image. In the next step S09, whether or not an instruction for image transmission is accepted is judged. The masked region determining processing is repeated until indication of a key of operation keys 14 to which entry of instruction for image transmission is assigned in advance, and when the key is indicated, the processing proceeds to step S10. This is to allow that after the masked region is determined, the operator transmits the operator's pick up image picked up and output firstly by camera 24.

In step S10, a composite image is generated. Specifically, such a composite image is generated that of the pick up image output by camera 24 after picking up the operator, the masked region determined in step S08 is replaced by another image. Another image is a preset image determined by the masked region determining processing in step S08 or an image painted out in a single color. In the next step S11, the composite image, instead of the preset characters that have started to be transmitted in step S05, is transmitted to the picture phone on the other end via wireless circuit 22. This allows that the composite image is displayed on the picture phone on the other end.

In the next step S12, follow-up processing is executed. The follow-up processing, described later, is processing for moving the masked region following the movement of the feature in the pick up image. In the next step S13, whether or not the communication is completed is judged. If the communication is completed, the processing is terminated, and if not, the processing goes back to step S10. This is for the purpose of transmitting the composite image until the communication is completed.

In the meantime, in step S14, in a similar fashion to step S09, whether or not an instruction for image transmission is accepted is judged. The processing turns into a stand-by state ("NO" in step S14) until the instruction for image transmission is accepted, and when the instruction for image transmission is accepted, the processing proceeds to step S15. This is to allow that after the instruction, the operator transmits the operator's pick up image picked up and output firstly by camera 24. The processing may proceed immediately to step S15 without accepting the instruction for image transmission.

In step S15, the pick up image is transmitted to the picture phone on the other end via wireless circuit 22. This allows that the pick up image is displayed on the picture phone on the other end. In the next step S16, whether or not the communication is completed is judged. If completed, the processing is terminated, and if not, the processing goes back to step S15. This is for the purpose of transmitting the pick up image until the communication is completed.

Figure 17:
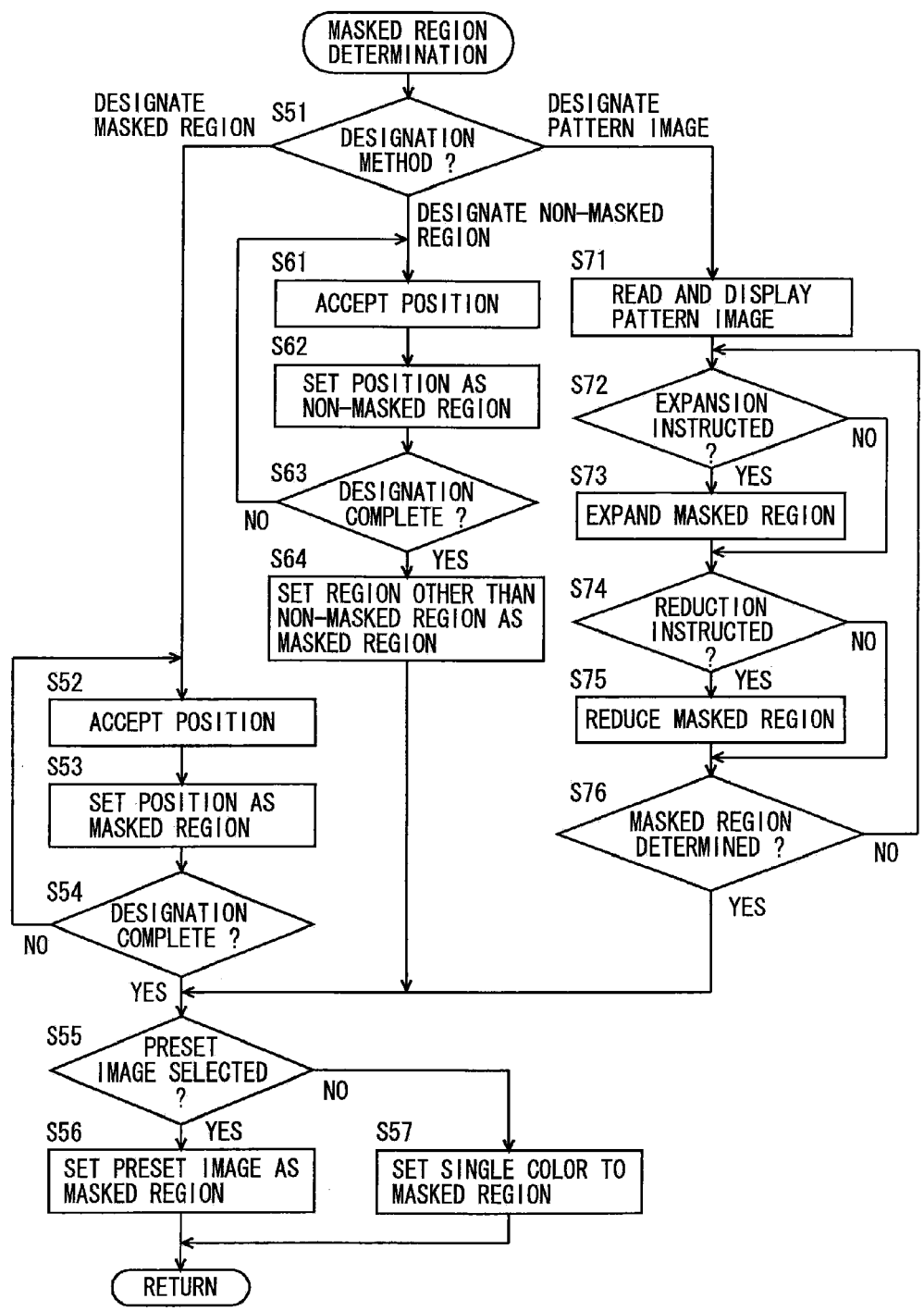
FIG. 17 is a flowchart showing an example of flow of masked region determining processing.

FIG. 17 is a flowchart showing an example of a flow of masked region determining processing. The masked region determining processing is processing executed in step S08 shown in FIG. 16. Referring to FIG. 17, the processing is branched according to the masked region designation method (step S51). The masked region designation method may be set in advance, or may be selected by the user by entering an instruction to operation portion 25.

When the masked region designation method is of masked region designation, the processing proceeds to step S52; if non-masked region designation, the processing proceeds to step S61; and if pattern image designation, the processing proceeds to step S71.

In step S52, a position in the pick up image displayed on LCD 16 is accepted. Specifically, a position corresponding to the position indicated on touch panel 25A is identified, or a position of the pick up image corresponding to the position of the pointer displayed on LCD 16 and indicated by indication key 15 is identified. Then, the accepted position is set as the masked region (step S53). A predetermined range from the accepted position may be set as the masked region, or a region defined by a plurality of positions accepted continuously may be set as the masked region.

Then, whether or not designation of the masked region is completed is judged (step S54). The designation of the masked region is judged to be completed when the user's instruction to complete designation of the masked region is entered through operation key 14. When designation of the masked region is completed, the processing proceeds to step S55, and if not completed, the processing goes back to step S52. This is for the purpose of enabling a plurality of masked regions to be designated.

In step S61, in a similar fashion to step S52, the position of the pick up image displayed on LCD 16 is accepted. Then, the accepted position is set as the non-masked region (step S62). A predetermined range from the accepted position may set as the non-masked region, or a region defined by a plurality of positions accepted continuously may be set as the non-masked region.

Then, whether or not designation of the non-masked region is completed is judged (step S63). The designation of non-masked region is judged to be completed when the user's instruction to complete designation of the masked region is entered through operation key 14. When designation of the non-masked region is completed, the processing proceeds to step S64, and if not completed, the processing goes back to step S61. This is for the purpose of enabling a plurality of non-masked regions to be designated. In step S64, a region of the pick up image other than the non-masked region is set as the masked region, and the processing proceeds to step S55.

Further, in step S71, a pattern image stored in advance in flash ROM 32 is read and displayed on LCD 16. Since the pick up image is displayed on LCD 16, an image in which the masked region included in the pattern region is superimposed onto the pick up image is displayed on LCD 16. A plurality of pattern images may be stored in advance in flash ROM 32 so that the user selects any one of the pattern images, or the user selects one of the plurality of pattern images based on a feature extracted from the pick up image. Further, the pattern image may be enlarged or reduced based on the size of the shooting object in the pick up image.

In step S72, whether or not an expansion instruction is entered is judged. The expansion instruction is accepted when, after the position of the masked region displayed on LCD 16 is accepted by touch panel 25A or indication key 15, a position other than the masked region is accepted continuously. When the expansion instruction is accepted, the processing proceeds to step S73, and if not, the processing proceeds to step S74. In step S73, the masked region is expanded, and the processing proceeds to step S74. Specifically, a position that is other than the masked region and is accepted continuously after the position of the masked region displayed on LCD 16 is accepted by touch panel 25A is changed to the masked region.

In step S74, whether or not a reduction instruction is entered is judged. The reduction instruction is accepted when, after the position of a region other than the masked region displayed on LCD 16 is accepted by touch panel 25A, the position of the masked region is accepted continuously. When the reduction instruction is accepted, the processing proceeds to step S75, and if not, the processing proceeds to step S76. In step S75, the masked region is reduced, and the processing proceeds to step S76. Specifically, the position of the masked region accepted continuously after the position of the non-masked region displayed on LCD 16 is accepted by touch panel 25A is changed to the non-masked region.

In step S76, whether or not the masked region is determined is judged. In other words, whether or not expansion and reduction of the masked region is completed is judged. The masked region is judged to be determined when the user's instruction to determine the masked region is entered through operation key 14. When the masked region is determined, the processing proceeds to step S55, and if not, the processing goes back to step S72. This is for the purpose of enabling a plurality of expansion and reduction of the masked region.

In step S55, whether or not a preset image is selected is judged. When the preset image stored in flash ROM 32 is selected, the processing proceeds to step S56, and if not selected, the processing proceeds to step S57. In step S56, the selected preset image is set to the image of the masked region, and the processing goes back. This allows generation of a composite image in which the masked region of the pick up image is replaced by the preset image.

Meanwhile, in step S57, a single color is set to the image of the masked region, and the processing goes back. This allows generation of a composite image in which the masked region of the pick up image is replaced by a single color image.

Masked region designation and non-masked region designation may be combined in designating the masked region. According to the designation method by masked region designation, a region in the pick up image that is not desired to be transmitted can be designated. According to the designation method by non-masked region designation, a region in the pick up image that is desired to be transmitted can be designated. Accordingly, designation of the masked region can be made more simply by a combination of the designation methods.

Figure 18:
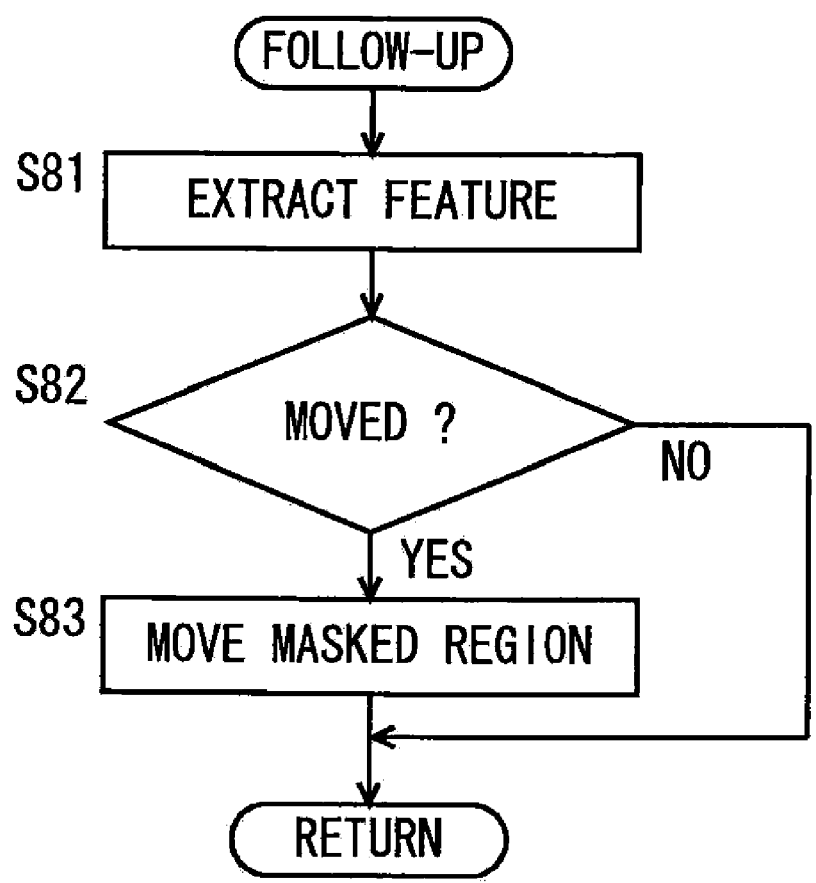
FIG. 18 is a flowchart showing an example of flow of follow-up processing.

FIG. 18 is a flowchart showing an example of a flow of follow-up processing. The follow-up processing is processing executed in step S12 in FIG. 16. Referring to FIG. 18, a feature is extracted from the pick up image (step S81). The feature is represented by image of human eye, characters, or the like. Then, whether or not the feature is moved is judged (step S82). Specifically, judgment is made as to whether there is any difference between the position of the currently extracted feature and the position of a feature extracted from a prior pick up image to the pick up image from which the current feature is extracted. If the positions of the features extracted from the two different pick up images differ, it is judged that the feature has moved. When the feature has moved, the processing proceeds to step S83, and if not moved, the processing goes back.

In step S83, the masked region is moved, and the processing goes back. The masked region is moved in parallel according to a vector obtained from the two features. When the masked region before movement is in contact with either of the four sides of the pick up image, the region between the contact side and the masked region is newly specified as a masked region.

Figure 19:
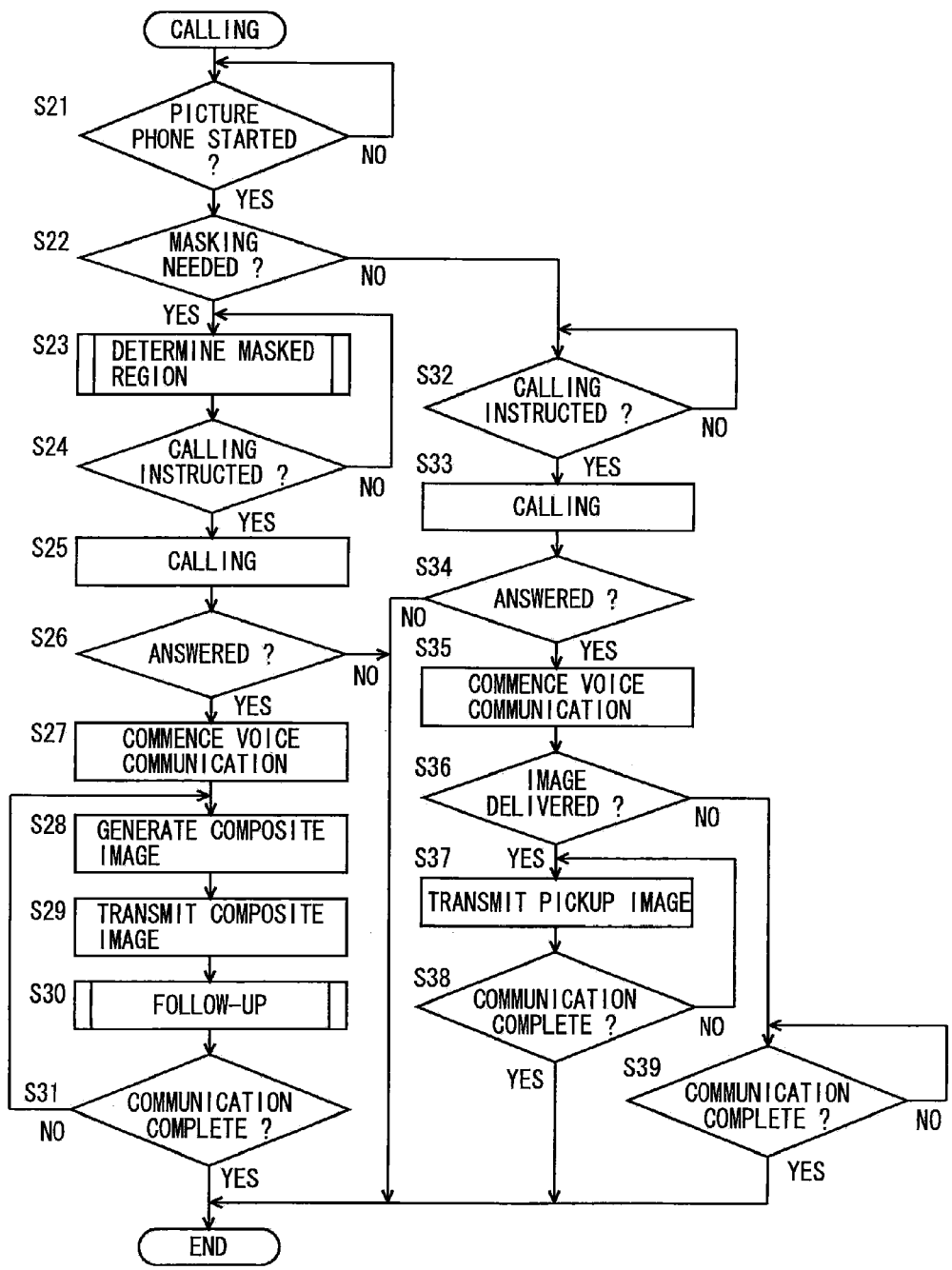
FIG. 19 is a flowchart showing an example of flow of calling processing.

FIG. 19 is a flowchart showing an example of a flow of calling processing. The calling processing is processing executed by control portion 21 by executing the pick up image transmission program. Referring to FIG. 19, control portion 21 judges whether or not the picture phone is started (step S21). The processing turns into a stand-by state until the picture phone is started, and upon starting of the picture phone, the processing proceeds to step S22. That is, the calling processing is processing executed on condition that the picture phone is started. In step S22, in similar fashion to step S07 in FIG. 15, whether the image to be transmitted should be masked is judged. When the image is masked, the processing proceeds to step S23, and if not, the processing proceeds to step S32.

In step S23, the masked region determining processing shown in FIG. 16 is executed. In the next step S24, whether or not a calling instruction is accepted is judged. When pressing of call key 14B is detected, the calling instruction is accepted and the processing proceeds to step S25, and if not, the processing goes back to step S23. This is to allow that the operator makes a calling after the masked region is determined and transmits a composite image in which the operator's pick up image picked up and output by camera 24 is masked.

In step S25, a calling is made and the processing proceeds to step S26. In step S26, whether or not the calling is answered is judged, and when answered, the processing proceeds to step S27, and if not, the processing is terminated.

In step S27, voice communication is commenced and the processing proceeds to step S28. In step S28, a composite image is generated. Specifically, such a composite image is generated that of the operator's pick up image picked up and output by camera 24, the masked region determined in step S23 is replaced by another image. Another image is a preset image determined by the masked region determining processing in step S23 or an image painted out by a single color. In the next step S29, the composite image is transmitted to the picture phone on the other end via wireless circuit 22. Thus, the composite image is displayed on picture phone on the other end.

In the next step S30, the follow-up processing shown in FIG. 16 is executed, and the processing proceeds to step S31. In step S31, whether or not the communication is completed is judged. If the communication is completed, the processing is terminated, and if the communication is not completed, the processing goes back to step S28.

Meanwhile, in step S32, the processing turns into a stand-by state until a calling instruction is accepted. Upon acceptance of the calling instruction, the processing proceeds to step S33. In step S33, a calling is made and the processing proceeds to step S34. In step S34, whether or not the calling is answered is judged, and when answered, the processing proceeds to step S35, and if not, the processing is terminated.

In step S35, voice communication is commenced and the processing proceeds to step S36. In step S36, whether to deliver an image is judged. When the image is delivered, the processing proceeds to step S37, and if not, the processing proceeds to step S39.

In step S37, the pick up image is transmitted to the picture phone on the other end via wireless circuit 22. Thus, the pick up image is displayed on the picture phone on the other end. In the next step S38, whether or not the communication is completed is judged. If the communication is completed, the processing is terminated, and if the communication is not completed, the processing goes back to step S37. This is for the purpose of transmitting the pick up image until the communication is completed. In step S38, whether or not the communication is completed is judged. The processing turns into a stand-by state until the communication is completed, and upon completion of the communication, the processing is terminated.

As explained above, cellular phone 1 in the present embodiment functions as the picture phone, and determines a masked region for masking at least a part of the pick up image when at least a partial region of the background of a pick up image of the operator is designated by touch panel 25A, and generates and transmits a composite image in which the masked region of the pick up image is converted to a preset image or a single color image. Therefore, a region such as background of the pick up image in which the operator is picked up is not transmitted, and it becomes possible that part of an image obtained by picking up is selected and is transmitted. For example, when the background includes an image which the operator does not desire to transmit, it is possible to prevent the image from being transmitted.

Further, designation of the masked region is possible while the pick up image is displayed on LCD 16, and therefore, any desired region can be selected from the pick up image, and a region which is not transmitted can be selected with ease.

Further, it is possible to display on LCD 16 an image in which a pattern image including a predetermined masked region is superimposed onto a pick up image, and to expand or reduce the masked region by manipulating touch panel 25A. Hence, the mask is displayed and the masked region is changed based on the accepted position of the display surface, and accordingly, a region which is not transmitted can be selected easily from the pick up image.

Further, when a feature such as eyes or characters is extracted from the pick up image, and the position of the feature changes in the pick up image, then the masked region in the pick up image is moved according to the change, and therefore, transmission of any region in the pick up image which is not desired to be transmitted can be prevented even when the picking up range of camera 24 is varied or the shooting object moves.

Further, since the pick up image is not transmitted unless a masked region is determined, it is possible to reliably prevent transmission of any image which is not desired to be transmitted.

While transmission of images on the picture phone function has been explained in the present embodiment, it is not limited to the picture phone function, and the present embodiment is applicable to transmission of images in the meeting function for transmission and receiving of a combination of characters, audio, and images as represented by, for example, Hello Messenger service provided by KDDI.

While explanation has been given in the present embodiment using cellular phone 1 as one example of the image transmission apparatus, it will be readily appreciated that the present invention can also be taken as such an image transmission method for causing the image transmission apparatus to execute processing shown in FIGS. 16 through 19, or as such a pick up image transmission program for causing a computer to execute processing shown in FIGS. 16 through 19.

What is claimed is:
1. An image transmission apparatus comprising:
an imaging portion to output a pick up image obtained by picking up a shooting object;
a display portion to display said pick up image;

a masked region determining portion to determine a masked region to mask at least a part of said pick up image displayed on said display portion;

a feature extraction portion to extract a feature from said pick up image;

a masked region movement portion to move said masked region determined by said masked region determining portion according to a change in a position of said feature;

a composite image generation portion to generate a composite image in which said masked region of said pick up image is converted to another image; and a transmission portion to transmit said composite image.

2. The image transmission apparatus according to claim 1, further comprising a facial region detection portion to detect a facial region from said pick up image, wherein said masked region determining portion determines a masked region based on said facial region detected.

3. An image transmission apparatus comprising:
an imaging portion to output a pick up image obtained by picking up a shooting object;
a display portion to display said pick up image;
an operation portion to accept an operation by a user;
a facial region detection portion to detect a facial region from said pick up image;
a masked region determining portion, based on said facial region detected, to determine a masked region to mask at least a part of said pick up image displayed on said display portion;
a change portion to change said masked region based on an operation by a user;
a composite image generation portion to generate a composite image in which said masked region of said pick up image is converted to another image; and
a transmission portion to transmit said composite image.

4. The image transmission apparatus according to claim 3, further comprising a masked region movement portion to move said masked region determined by said masked region determining portion according to a change in a position of said facial region detected.

5. An image transmission method comprising:
outputting a pick up image obtained by picking up a shooting object;
displaying said pick up image;
determining a masked region to mask at least a part of said pick up extracting a feature from said pick up image;
moving said masked region according to a change in a position of said feature;
generating a composite image in which said masked region of said pick up image is converted to another image; and
transmitting said composite image.

6. The image transmission method according to claim 5 further comprising detecting a facial region from said pick up image, and wherein determining a masked region comprises determining said masked region based on said facial region detected.

7. An image transmission method comprising:
outputting a pick up image obtained by picking up a shooting object;
displaying said pick up image;
accepting an operation by a user;
detecting a facial region from said pick up image;
determining a masked region to mask at least a part of said pick up image based on said facial region detected;
changing said masked region based on an operation by a user;
generating a composite image in which said masked region of said pick up image is converted to another image; and
transmitting said composite image.

8. The image transmission method according to claim 7, further comprising moving said masked region according to a change in a position of said facial region detected.

9. A non-transitory computer-readable medium storing computer-executable instructions that when executed perform a method of transmitting images, the method comprising:
outputting a pick up image obtained by picking up a shooting object;
displaying said pick up image;
determining a masked region to mask at least a part of said pick up image;
extracting a feature from said pick up image;
moving said masked region according to a change in a position of said feature;
generating a composite image in which said masked region of said pick up image is converted to another image; and
transmitting said composite image.

10. The non-transitory computer-readable medium according to claim 9, wherein the method further comprises detecting a facial region from said pick up image, and wherein determining a masked region comprises determining said masked region based on said facial region detected.

11. A non-transitory computer-readable medium storing computer-executable instructions that when executed perform a method of transmitting images, the method comprising:
outputting a pick up image obtained by picking up a shooting object;
displaying said pick up image;
accepting an operation by a user;
detecting a facial region from said pick up image;
determining a masked region to mask at least a part of said pick up image based on said facial region detected;
changing said masked region based on an operation by a user;
generating a composite image in which said masked region of said pick up image is converted to another image; and
transmitting said composite image.

12. The non-transitory computer-readable medium according to claim 11, wherein the method further comprises moving said masked region according to a change in a position of said facial region detected.

* * * * *